(12) United States Patent
Kim et al.

(10) Patent No.: US 11,311,445 B2
(45) Date of Patent: Apr. 26, 2022

(54) WEARABLE APPARATUS FOR ASSISTING MUSCULAR STRENGTH

(71) Applicants: HYUNDAI MOTOR COMPANY, Seoul (KR); KIA MOTORS CORPORATION, Seoul (KR)

(72) Inventors: Beom Su Kim, Yongin-si (KR); Hyun Seop Lim, Anyang-si (KR); Kyu Jung Kim, Seoul (KR); Dong Jin Hyun, Suwon-si (KR); Ki Hyeon Bae, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 209 days.

(21) Appl. No.: 16/863,446

(22) Filed: Apr. 30, 2020

(65) Prior Publication Data

US 2021/0154081 A1 May 27, 2021

(30) Foreign Application Priority Data

Nov. 26, 2019 (KR) .......................... 10-2019-0153736

(51) Int. Cl.
*A61H 1/02* (2006.01)
*A61H 1/00* (2006.01)
(Continued)

(52) U.S. Cl.
CPC .............. *A61H 1/0281* (2013.01); *A61H 1/00* (2013.01); *A61H 1/0274* (2013.01);
(Continued)

(58) Field of Classification Search
CPC .............. A61H 1/02; A61H 2001/0207; A61H 1/0274; A61H 1/0277; A61H 1/0281;
(Continued)

(56) References Cited

U.S. PATENT DOCUMENTS

| 2011/0164949 A1* | 7/2011 | Kim ..................... A61H 1/0281 414/1 |
| 2013/0158438 A1* | 6/2013 | Scott .................... A61H 1/0237 600/595 |

(Continued)

FOREIGN PATENT DOCUMENTS

| JP | 2009-511779 A | 3/2009 |
| KR | 10-1896181 B1 | 9/2018 |

(Continued)

*Primary Examiner* — Justine R Yu
*Assistant Examiner* — Alexander Morales
(74) *Attorney, Agent, or Firm* — McDonnell Boehnen Hulbert & Berghoff LLP

(57) ABSTRACT

A wearable apparatus for assisting muscular strength includes a base secured to a torso, a first rotary link coupled at a first end to the base to be rotatable about a first rotating axis and extending at a second end to a first side of the wearer to be moved forwards or backwards, a first extension link extending at a first end to the first side of the wearer and located at a second end on a wearer's flank, a first connecting part coupled at a first end to the second end of the first rotary link to be rotatable about a second rotating axis, and coupled at a second end to the first end of the first extension link to be rotatable about a third rotating axis, and a first upper-arm fixing part rotatably coupled at a first end to the second end of the first extension link.

13 Claims, 5 Drawing Sheets

(51) Int. Cl.
*B25J 9/00* (2006.01)
*B25J 9/06* (2006.01)

(52) U.S. Cl.
CPC ........... *B25J 9/0006* (2013.01); *B25J 9/0009* (2013.01); *B25J 9/06* (2013.01); *A61H 2001/0203* (2013.01); *A61H 2201/0192* (2013.01); *A61H 2201/1635* (2013.01); *A61H 2201/1638* (2013.01); *A61H 2201/1652* (2013.01); *A61H 2201/1664* (2013.01); *A61H 2201/1673* (2013.01)

(58) Field of Classification Search
CPC .... A61H 2201/1253; A61H 2201/1261; A61H 2201/1269; A61H 2201/1418; A61H 2201/149; A61H 2201/1623; A61H 2201/1626; A61H 2201/1671; A61H 2205/06; A61H 2205/062; B25J 9/0006
USPC ............................... 601/5, 33, 23, 24, 25, 26
See application file for complete search history.

(56) References Cited

U.S. PATENT DOCUMENTS

| | | | |
|---|---|---|---|
| 2014/0158839 A1* | 6/2014 | Doyle | A61B 90/60 |
| | | | 248/118 |
| 2016/0206497 A1* | 7/2016 | Deshpande | B25J 9/0006 |
| 2016/0339583 A1* | 11/2016 | Van Engelhoven | B25H 1/10 |
| 2017/0144309 A1* | 5/2017 | Sankai | B25J 9/0009 |
| 2017/0173783 A1* | 6/2017 | Angold | B25J 9/109 |
| 2019/0321965 A1* | 10/2019 | Van Engelhoven | B25J 9/0006 |
| 2020/0139537 A1* | 5/2020 | Mois | A61H 3/00 |
| 2020/0281796 A1* | 9/2020 | Lakany | B25J 9/0006 |
| 2021/0197361 A1* | 7/2021 | Baptista | B25J 9/14 |

FOREIGN PATENT DOCUMENTS

| | | | | |
|---|---|---|---|---|
| WO | 2007/044553 A2 | 4/2007 | | |
| WO | WO-2019081851 A1 * | 5/2019 | ............ | B25J 9/0006 |

* cited by examiner

WEARABLE APPARATUS FOR ASSISTING MUSCULAR STRENGTH

CROSS REFERENCE TO RELATED APPLICATION

The present application claims priority to Korean Patent Application No. 10-2019-0153736, filed Nov. 26, 2019, the entire contents of which are incorporated herein for all purposes by this reference.

BACKGROUND

Field

The present disclosure relates to a wearable apparatus for assisting muscular strength. More particularly, the disclosure relates to an apparatus which is worn on the upper limbs of a human body to assist the muscular strength of the upper limbs by simulating a shoulder movement.

Description of the Related Art

A wearable robot is a robot that is worn on a specific region of a body or holds a specific region to assist the motion of the body, and is designed for medical, military, or work purposes. Especially in the case of the wearable robot for work purposes, the robot is designed to prevent injury and assist muscular strength by reducing load imposed on a worker. Such a wearable robot simulates a wearer's skeleton, and the key technology for the robot is to design joints so that they have the same motion as the actual motion of the body.

In particular, a wearable instrument for assisting the muscular strength of upper arms includes a manual support device configured to assist a person who supports the weight of a tool. A typical manual apparatus is configured to compensate for gravity under a range of locations using a combination of structural elements, springs, cables, and pulleys. The configuration of these devices compensates for gravity within a limited operating range.

However, the conventional wearable instrument for assisting the muscular strength of the upper arms is problematic in that it is difficult to properly simulate the motion of the skeleton caused by the wearer's movement. In particular, this is problematic in that it is difficult to simulate a scapulohumeral rhythm that is the proportional movement of the scapula and the humerus when the wearer's shoulder rotates.

The description provided above as a related art of the present disclosure is just for helping understanding the background of the present disclosure and should not be construed as being included in the related art known by those skilled in the art.

SUMMARY

The present disclosure has been made in order to solve the above-mentioned problems in the prior art and an object of the present disclosure is to provide a wearable apparatus for assisting muscular strength which is configured to simulate a scapulohumeral rhythm caused by the movement of a wearer's shoulder.

In order to achieve the object of the present disclosure, a wearable apparatus for assisting muscular strength may include a base secured to a wearer's torso; a first rotary link coupled at a first end thereof to the base to be rotatable about a first rotating axis that extends in a up and down direction, and extending at a second end thereof to a first side of the wearer to be moved forwards or backwards as the first rotary link rotates about the base; a first extension link extending at a first end located at the wearer's back to the first side of the wearer, bent forwards, and located at a second end thereof on a wearer's flank; a first connecting part coupled at a first end thereof to the second end of the first rotary link to be rotatable about a second rotating axis that extends in a forwards or backwards, coupled at a second end thereof to the first end of the first extension link to be rotatable about a third rotating axis that extends forwards or backwards, and connected to the first rotary link to perform a relative motion vertically or laterally in a state where the first extension link is parallel with the first rotary link; and a first upper-arm fixing part coupled at a first end thereof to the second end of the first extension link to be rotatable about a fourth rotating axis that extends in the up and down direction, and connected to one upper arm of the wearer.

The wearable apparatus may further include a fixing link fixed to the wearer while being located on the wearer's back, and extending in a up and down direction of the wearer, and the base may be fixedly coupled to the fixing link.

The first end of the first rotary link may extend to a second side of the wearer to be rotatably coupled to the base on the second side of the wearer with respect to a center of the base.

The wearable apparatus may further include a second rotary link coupled at a first end thereof to the base to be rotatable about a rotating axis extending in the up and down direction, and extending at a second end thereof to the second side of the wearer to move forwards or backwards as the second rotary link rotates about the base, wherein the second rotary link may extend to the first side of the wearer, so that the first end thereof may be rotatably coupled to the base on the first side of the wearer with respect to the center of the base.

The first end of the first rotary link may be located on the second side of the wearer with respect to the fixing link, and the first end of the second rotary link may be located on the first side of the wearer with respect to the fixing link, and the first rotary link and the second rotary link may be rotatably coupled to the base, respectively, to be spaced apart from each other in the up and down direction.

The wearable apparatus may further include a first rotary elastic member located between the first end of the first rotary link and the base, and applying a rotating force to the first end of the first rotary link to rotate the first rotary link in a direction in which the second end of the first rotary link comes into close contact with the wearer's back.

The first connecting part may include a first bending link that is coupled at both ends thereof to the first rotary link and the first extension link, and a second bending link that is coupled at both ends thereof to the first rotary link and the first extension link to be spaced apart from both ends of the first bending link.

The wearable apparatus may further include a first elastic tension member coupled at both ends to the first rotary link and the first extension link, and applying an elastic force so that the first extension link moves upwards or outwards with respect to the first rotary link.

The first connecting part may include a first bending link that is coupled at both ends thereof to the first rotary link and the first extension link, and a second bending link that is coupled at both ends thereof to the first rotary link and the first extension link to be spaced apart from both ends of the first bending link, and the first bending link and the second bending link may extend to be spaced apart from the first elastic tension member, and both ends of the first elastic tension member may be coupled to the first rotary link and the first extension link, respectively, at a position where the first bending link is coupled to the first rotary link and a position where the second bending link is coupled to the first extension link.

The first elastic tension member may be located between the first bending link and the second bending link, the first bending link may be bent outwards of the first elastic tension member at a position where it is coupled to the first rotary link while extending in a direction where the first elastic tension member extends, and the second bending link may be bent outwards of the first elastic tension member at a position where it is coupled to the first extension link while extending in a direction where the first elastic tension member extends.

The first extension link may be slidable such that a length thereof is variable laterally or forwards or backwards.

The wearable apparatus may further include a first upper-arm rotating part extending in parallel with the upper arm outside the upper arm, rotatably coupled at a first end thereof to the first upper-arm fixing part with respect to a fifth rotating axis extending in a direction parallel to the ground, and movable at a second end thereof upwards or downwards.

The first upper-arm rotating part may include an extension part extending to a lower portion of the upper arm to support the upper arm.

According to the wearable apparatus for assisting muscular strength of the present disclosure, it is possible to naturally simulate a wearer's shoulder movement caused by a complex joint motion.

In particular, the disclosure is configured to simulate a scapulohumeral rhythm caused by the movement of a wearer's shoulder, thus assisting muscular strength while minimizing the feeling of awkwardness when worn.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Figure 1:
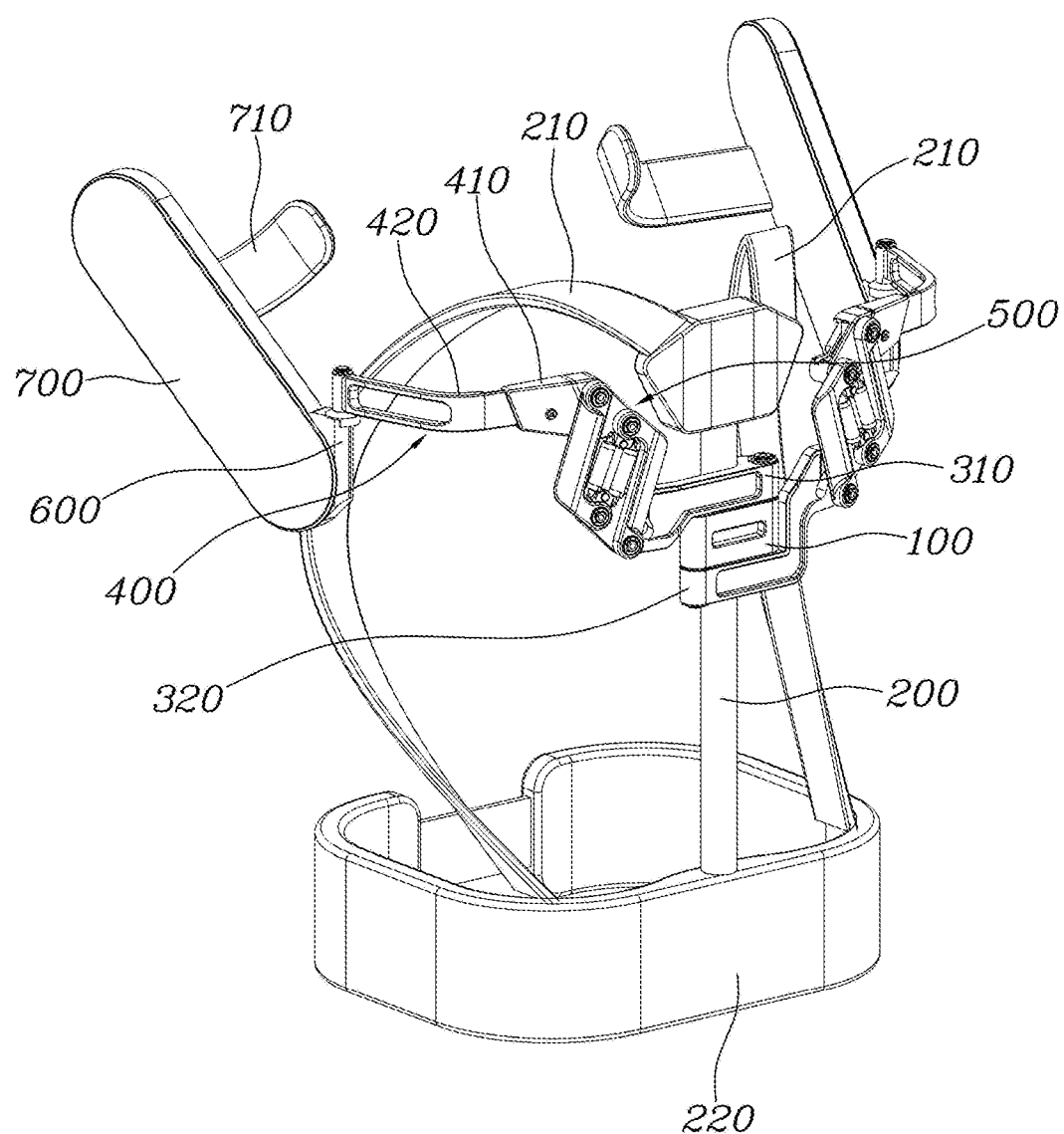
FIG. 1 is a rear perspective view showing a wearable apparatus for assisting muscular strength according to an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

The present disclosure may, however, be embodied in many different forms and should not be construed as being limited to only the embodiments set forth herein, but should be construed as covering modifications, equivalents, or alternatives falling within ideas and technical scopes of the present disclosure. However, it is to be understood that the present description is not intended to limit the present disclosure to those exemplary embodiments, and the present disclosure is intended to cover not only the exemplary embodiments, but also various alternatives, modifications, equivalents, and other embodiments that fall within the spirit and scope of the present disclosure.

It will be understood that, although the terms "first", "second", etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, the present disclosure will be explained in detail by describing exemplary embodiments of the present disclosure with reference to the accompanying drawings. The same reference numerals are used throughout the drawings to designate the same or similar components.

Figure 2:
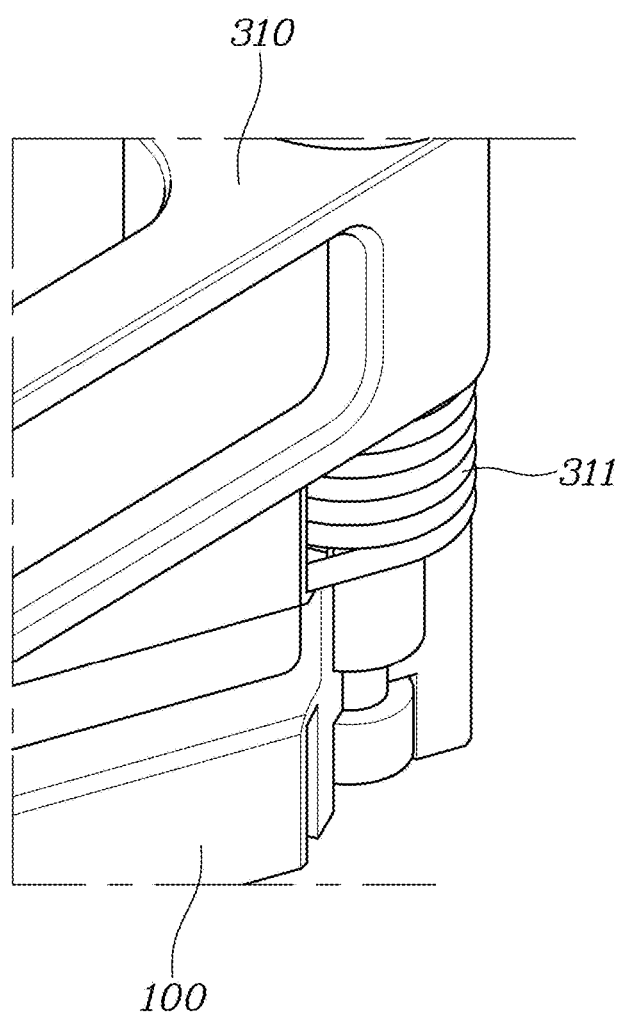
FIG. 2 is an enlarged view of a portion of FIG. 1.
Figure 3:
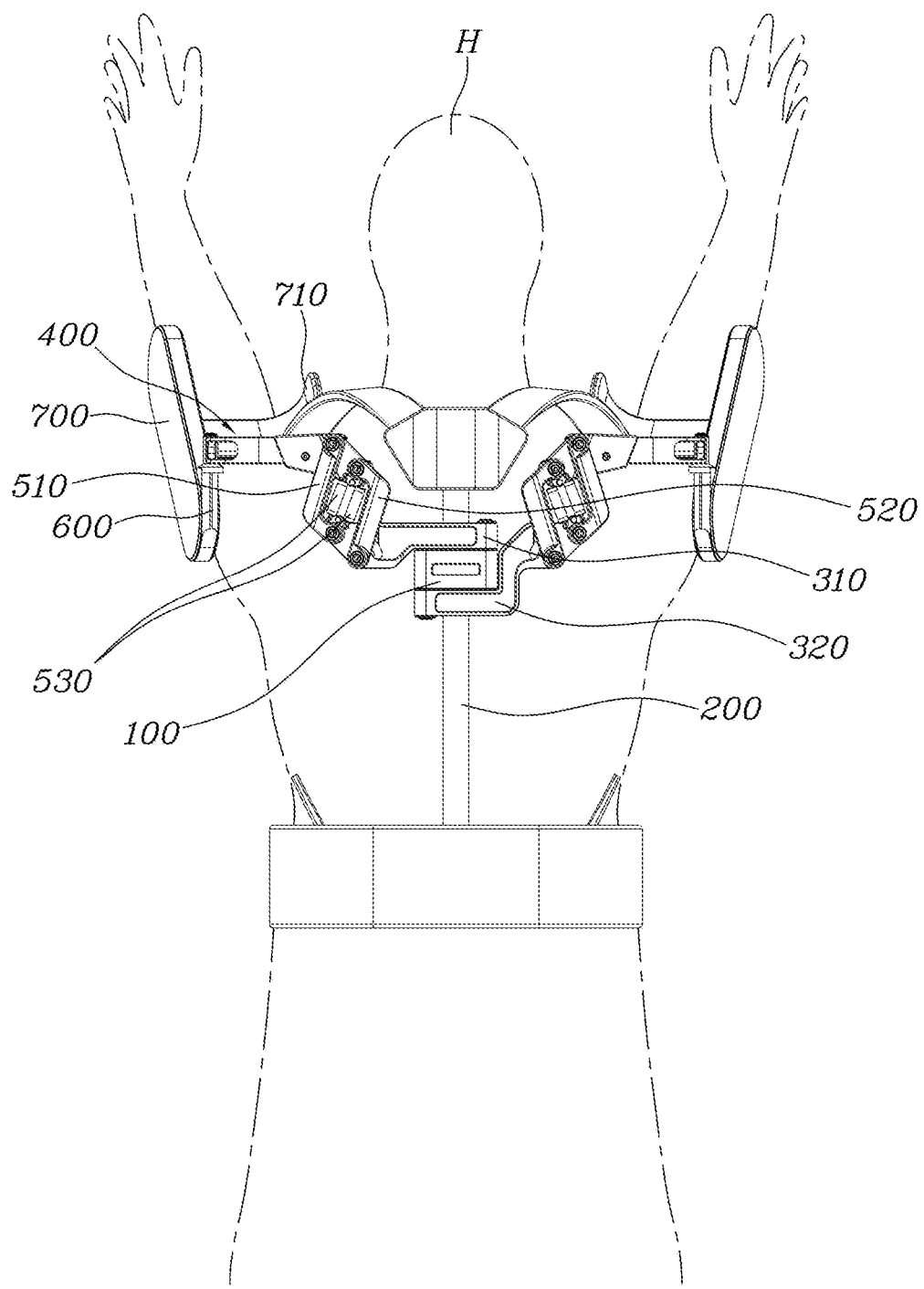
FIG. 3 is a rear view showing a state in which a wearer wears the wearable apparatus for assisting the muscular strength according to the embodiment of the present disclosure.

FIG. 1 is a rear perspective view showing a wearable apparatus for assisting muscular strength according to an embodiment of the present disclosure, FIG. 2 is an enlarged view of a portion of FIG. 1, and FIG. 3 is a rear view showing a state in which a wearer wears the wearable apparatus for assisting the muscular strength according to the embodiment of the present disclosure.

Referring to FIGS. 1 to 3, the wearable apparatus for assisting the muscular strength according to the embodiment of the present disclosure includes a base 100, a first rotary link 310, a first extension link 400, a first connecting part 500, and a first upper-arm fixing part 600. The base 100 is secured to a wearer's torso. The first rotary link 310 is coupled at one end thereof to the base 100 to be rotatable about a first rotating axis that extends in a up and down direction, and extends at the other end to one side of the wearer to be moved forwards or backwards as the first rotary link rotates about the base 100. The first extension link 400 extends at one end located at the wearer's back to one side of the wearer, is bent forwards, and is located at the other end on a wearer's flank. The first connecting part 500 is coupled at one end thereof to the other end of the first rotary link 310 to be rotatable about a second rotating axis that extends forwards or backwards, and is coupled at the other end to one end of the first extension link 400 to be rotatable about a third rotating axis that extends forwards or backwards, and is connected to the first rotary link 310 to perform a relative motion vertically or laterally in a state where the first extension link 400 is parallel with the first rotary link 310. The first upper-arm fixing part 600 is coupled at one end thereof to the other end of the first extension link 400 to be rotatable about a fourth rotating axis that extends in the up and down direction, and is connected to the wearer's upper arm while extending in a direction parallel to one upper arm of the wearer.

The base 100 may be secured to the wearer's torso to be located on the wearer's back. In particular, the base 100 may be secured to a central portion where the wearer's spine is located.

To be more specific, the apparatus further includes a fixing link 200 that is fixed to the wearer while being located on the wearer's back and extends in the vertical direction of the wearer. The base 100 may be fixedly coupled to the fixing link 200.

The fixing link 200 may extend in the up and down direction to correspond to the wearer's spine, and may be fixed to the central portion on the wearer's back. The fixing link 200 may be coupled to the wearer's torso, and may be secured to the wearer's torso via a separate harness or the like.

According to an embodiment, the apparatus may further include a waist harness 220 that is secured to the fixing link 200 and is coupled at both ends thereof while surrounding the torso at the height of the wearer's waist. Furthermore, the apparatus may further include a shoulder harness 210 that extends from the wearer's back through the upper portion of the shoulder to a front, passes through the lower portion of the wearer's shoulder, and is connected to the wearer's back again, thus surrounding the wearer's shoulder. Ends of the shoulder harness 210 may be coupled to the fixing link 200 or the waist harness 220.

The first rotary link 310 is coupled to the base 100 to be rotatable about the first rotating axis that extends in the up and down direction, so that the first rotary link may rotate laterally about one end. The first rotary link 310 may extend to one side of the wearer with respect to the base 100. As the first rotary link 310 coupled to the base 100 is rotated at one end thereof, the other end may move forwards or backwards.

One side of the wearer may be the left or right side of the wearer. The above-described first rotary link 310, first extension link 400, first connecting part 500, and first upper-arm fixing part 600 may be connected to support the left or right upper arm of the wearer. Further, a second rotary link 320, a second extension link (not shown), a second connecting part (not shown), and a second upper-arm fixing part (not shown) may be further included on an opposite side to correspond to the first rotary link 310, the first extension link 400, the first connecting part 500, and the first upper-arm fixing part 600, thus supporting both upper arms of the wearer.

The first extension link 400 may be connected through the first connecting part 500 to the first rotary link 310. The first extension link 400 may extend to one side of the wearer to be parallel to the first rotary link 310. The first extension link 400 may be moved vertically and laterally relative to the first rotary link 310 while remaining in parallel with the first rotary link 310 through the first connecting part 500.

The first connecting part 500 is coupled at one end thereof to the other end of the first rotary link 310 to be rotatable about the second rotating axis that extends forwards or backwards, and is coupled at the other end to one end of the first extension link 400 to be rotatable about the third rotating axis that extends forwards or backwards. In particular, the first connecting part 500 may include a plurality of links as will be described later.

The first upper-arm fixing part 600 is coupled at one end thereof to the other end of the first extension link 400 to be rotatable about a fourth rotating axis that extends in the up and down direction. As one end of the first upper-arm fixing part 600 rotates relative to the first extension link 400, the other end may be moved forwards or backwards.

The apparatus further includes the second rotary link 320 that is coupled at one end thereof to the base 100 to be rotatable about a rotating axis extending in the up and down direction, and extends at the other end to the other side of the wearer to move forwards or backwards as the second rotary link rotates about the base 100. The second rotary link 320 may extend to one side of the wearer, so that one end thereof may be rotatably coupled to the base 100 on one side of the wearer with respect to the center of the base 100.

Figure 4:
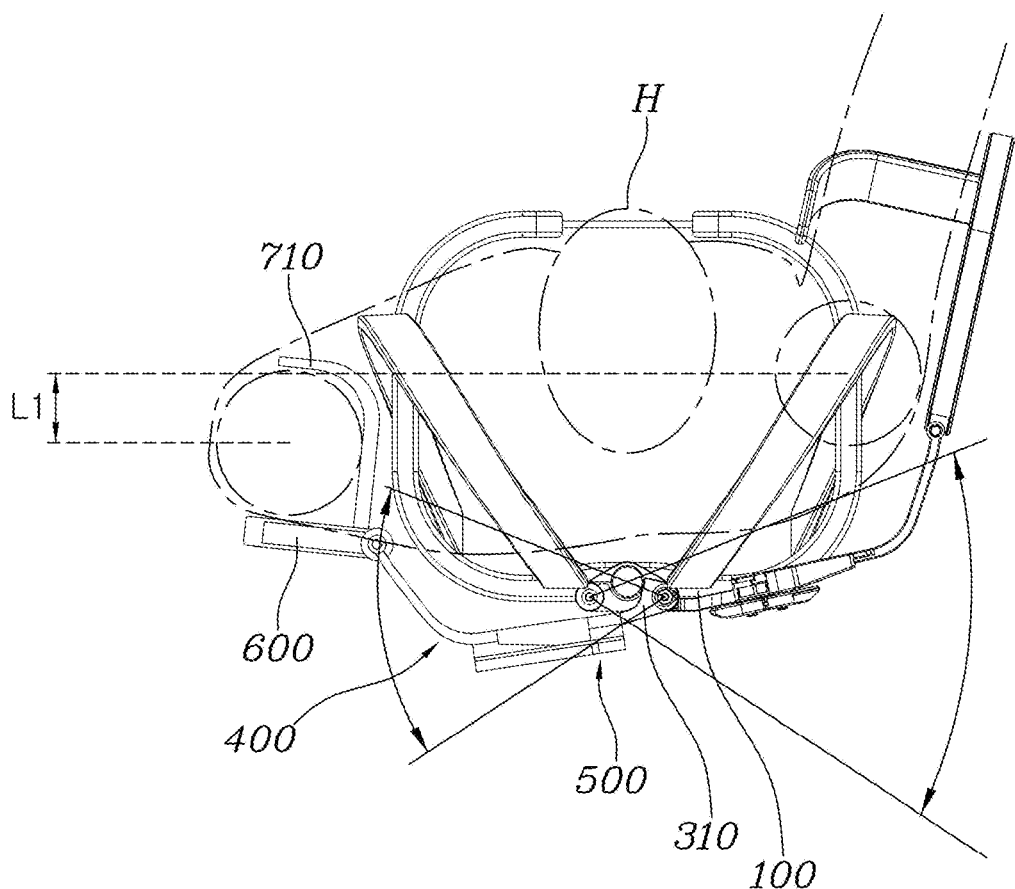
FIGS. 4 and 5 are a rear view and a top view showing a state in which the wearer wears the wearable apparatus for assisting muscular strength according to the embodiment of the present disclosure, and the left and right upper arms are moved in opposite directions.
Figure 5:
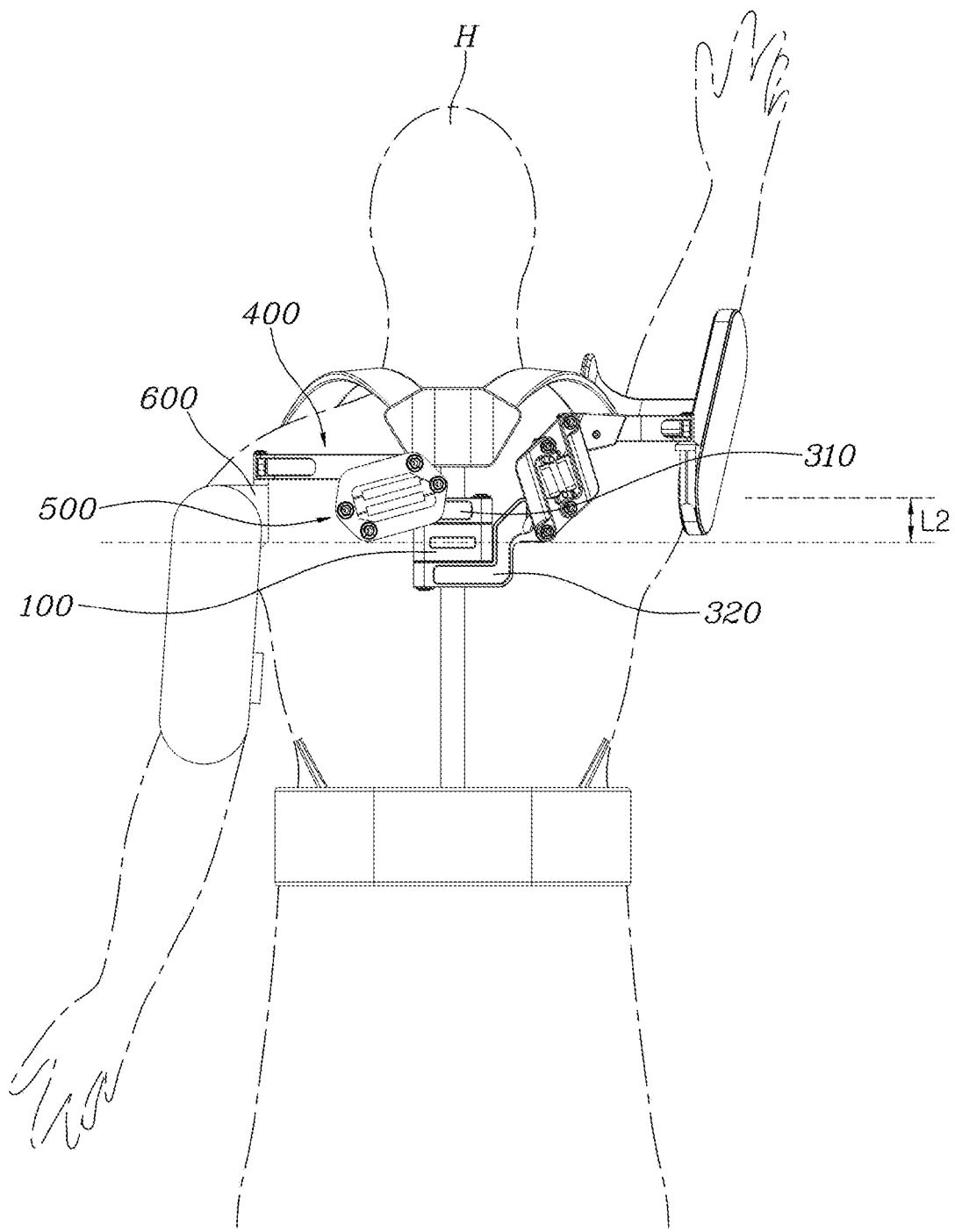

FIGS. 4 and 5 are a rear view and a top view showing a state in which the wearer wears the wearable apparatus for assisting the muscular strength according to the embodiment of the present disclosure, and the left and right upper arms are moved in opposite directions.

Referring to FIGS. 4 and 5, one end of the first rotary link 310 may extend to the other side of the wearer to be rotatably coupled to the base 100 on the other side of the wearer with respect to the center of the base 100.

As shown in FIG. 4, when the wearer's shoulder performs protraction or retraction movement, the wearer's scapula may be moved forwards or backwards.

In particular, the rotation center of the wearer's shoulder joint may be displaced forwards or backwards by L1 when changing from the retraction (pull-back) state to the protraction (push-forward) state. In order to simulate the protraction/retraction movement of the wearer's shoulder joint, one end of each of the first rotary link 310 and the second rotary link 320 may be coupled to the base 100 to be rotatable laterally, thus allowing the other end to move forwards or backwards.

According to an embodiment, one end of the first rotary link 310 may be rotated about the first rotating axis located on the other side of the wearer. That is, the first rotary link 310 that extends at the other end to one side of the wearer may be located on the other side of the wearer that is an opposite side to the rotation center (first rotating axis).

Thus, the rotation radius of the first rotary link 310 is located in the wearer's torso to overcome the limit of a skeleton device whose rotation center is not located in the wearer's torso, thus minimizing the feeling of awkwardness during the wearer's exercise.

According to another embodiment, the rotary link may be rotatably coupled to the center of the fixing link 200 or the center of the wearer's back, or the first rotating axis may be located in one side of the wearer.

The apparatus may further include the second rotary link 320 that is coupled at one end thereof to the base 100 to be rotatable about the rotating axis extending in the up and down direction, and extends at the other end to the other side of the wearer to move forwards or backwards as the second rotary link rotates about the base 100. The second rotary link 320 may extend to one side of the wearer, so that one end thereof may be rotatably coupled to the base 100 on one side of the wearer.

The other end of the second rotary link 320 may extend to the other side of the wearer that is an opposite side to the first rotary link 310. One end of the second rotary link 320 may be coupled to the base 100 to be rotatable about the rotating axis extending in the up and down direction. One end of the second rotary link 320 may be rotatably coupled to the base 100 on one side of the wearer.

Therefore, as shown in the drawings, one end of the first rotary link 310 may be coupled to the base 100 on the right side of the wearer with respect to the fixing link 200, while the other end may extend to the left side of the wearer. One end of the second rotary link 320 may be coupled to the base 100 on the left side of the wearer with respect to the fixing link 200, while the other end may extend to the right side of the wearer.

That is, the first rotary link 310 and the second rotary link 320 to cross each other in a plane parallel to the ground.

One end of the first rotary link 310 may be located on the other side of the wearer with respect to the fixing link 200, one end of the second rotary link 320 may be located on one side of the wearer with respect to the fixing link 200, and the first rotary link 310 and the second rotary link 320 may be rotatably coupled to the base 100, respectively, while being spaced apart from each other in the up and down direction.

Since the first rotary link 310 coupled to the base 100 on the other side of the wearer and the second rotary link 320 coupled to the base 100 on one side of the wearer cross each other in the plane parallel to the ground, the links may be spaced apart from each other in the up and down direction.

According to an embodiment, the first rotary link 310 and the second rotary link 320 may be coupled, respectively, to upper and lower portions of the base 100 extending laterally from the wearer.

The apparatus may further include a first rotary elastic member 311. The first rotary elastic member 311 is located between one end of the first rotary link 310 and the base 100, and applies a rotating force to one end of the first rotary link 310 to rotate the first rotary link 310 in a direction in which the other end of the first rotary link 310 comes into close contact with the wearer's back.

The first rotary elastic member 311 may be a torsion spring, for example. The first rotary elastic member 311 may generate a rotating force so that the first rotary link 310 rotates about one end thereof by the elastic deformation of the first rotary elastic member. In particular, as the first rotary link 310 is rotated in a direction in which the other end of the first rotary link 310 moves to the rear of the wearer, the first rotary elastic member 311 may be elastically deformed to generate an elastic force, and may generate a rotating force in a direction in which the other end of the first rotary link 310 moves to the front of the wearer. Thus, the first rotary link 310 can be in close contact with the wearer's back.

As shown in FIG. 5, when the wearer elevates or depresses his or her shoulder, the rotation center of the shoulder joint may be moved up and down by L2.

In order to simulate the elevation or depression of the wearer's shoulder, the first connecting part 500 may be located between the first rotary link 310 and the first extension link 400 to vary a vertical distance between the first rotary link 310 and the second extension link.

In particular, the first extension link 400 may be moved upwards with respect to the first rotary link 310 and simultaneously moved outwards by the first connecting part 500.

The first connecting part 500 may include a first bending link 510 that is coupled at both ends thereof to the first rotary link 310 and the first extension link 400, and a second bending link 520 that is coupled at both ends thereof to the first rotary link 310 and the first extension link 400 to be spaced apart from both ends of the first bending link.

The first bending link 510 and the second bending link 520 may be coupled to the first rotary link 310 and the first extension link 400, respectively, to be rotatable about the rotating axis extending forwards or backwards. Both ends of the first bending link 510 and both ends of the second bending link 520 may be spaced apart from each other to be coupled to the first rotary link 310 and the first extension link 400.

In other words, the first bending link 510 and the second bending link 520 may form a 4-bar linkage between the first rotary link 310 and the first extension link 400. The first bending link 510 and the second bending link 520 may extend side by side, may extend obliquely, or may extend to cross each other.

The apparatus may further include a first elastic tension member 530 that is coupled at both ends to the first rotary link 310 and the first extension link 400, and applies an elastic force so that the first extension link 400 moves upwards or outwards with respect to the first rotary link 310.

The first elastic tension member 530 may be a spring that is stretched or contracted in a linear direction, and may be composed of a plurality of springs as shown in the drawing. The first elastic tension member 530 may be connected between the first rotary link 310 and the first extension link 400 such that its length may be varied depending on a relative movement between the first rotary link 310 and the first extension link 400, and consequently the elastic force may be generated.

In particular, the elastic force of the first elastic tension member 530 may be applied in a direction in which the first extension link 400 moves upwards or outwards with respect to the first rotary link 310. To be more specific, the first extension link 400 may be moved both vertically and laterally with respect to the first rotary link 310 by the first bending link and the second bending link. Thus, the first elastic tension member 530 coupled at both ends to the first extension link 400 and the first rotary link 310 may be varied in length.

According to an embodiment, as shown in the drawing, the first elastic tension member 530 may be connected so that its length may be reduced as the first extension link 400 moves upwards and outwards relative to the first rotary link 310. The first elastic tension member 530 may generate the elastic force in a direction in which the first extension link 400 and the first rotary link 310 pull on each other.

The first elastic tension member 530 may be tensioned by load acting on the wearer's shoulder or upper arm and the weight of the apparatus. Thus, the first extension link 400 may be moved downwards with respect to the first rotary link 310.

According to another embodiment, the first elastic tension member 530 may be connected so that its length may be increased as the first extension link 400 moves upwards and outwards relative to the first rotary link 310. The first elastic tension member 530 may generate the elastic force in a direction in which the first extension link 400 and the first rotary link 310 push against each other.

In particular, the first bending link 510 and the second bending link 520 may extend to be spaced apart from the first elastic tension member 530, and both ends of the first elastic tension member 530 may be coupled to the first rotary link 310 and the first extension link 400, respectively, at a position where the first bending link 510 is coupled to the first rotary link 310 and a position where the second bending link 520 is coupled to the first extension link 400.

According to an embodiment, one end of the first elastic tension member 530 may be simultaneously coupled to the first bending link 510 at a position where the first bending link is coupled to the first rotary link 310, and the other end of the first elastic tension member 530 may be simultaneously coupled to the second bending link 520 at a position where the second bending link is coupled to the first extension link 400.

Thus, it is possible to fix the first elastic tension member 530 without adding the configuration for coupling both ends of the first elastic tension member 530, thus simplifying a structure.

The first elastic tension member 530 may be located between the first bending link 510 and the second bending link 520, the first bending link 510 may be bent outwards of the first elastic tension member 530 at a position where it is coupled to the first rotary link 310 while extending in a direction where the first elastic tension member 530 extends, and the second bending link 520 may be bent outwards of the first elastic tension member 530 at a position where it is coupled to the first extension link 400 while extending in a direction where the first elastic tension member 530 extends.

The first bending link 510 and the second bending link 520 may extend side by side to be spaced apart from each other, and the first elastic tension member 530 may be located between the first bending link 510 and the second bending link 520.

The first bending link 510 may be bent outwards of the first elastic tension member 530 at a position where it is coupled to the first rotary link 310 to be spaced apart from the first elastic tension member 530, and may extend in a direction where the first elastic tension member 530 extends while being spaced apart from the first elastic tension member 530.

Likewise, the second bending link 520 may be bent outwards of the first elastic tension member 530 at a position where it is coupled to the first extension link 400 to be spaced apart from the first elastic tension member 530, and may extend in a direction where the first elastic tension member 530 extends while being spaced apart from the first elastic tension member 530.

Thus, the first elastic tension member 530 has the effect of being stretched or contracted without interfering with the rotating first bending link 510 or second bending link 520.

The first extension link 400 is slidable such that its length is variable laterally or forwards or backwards.

In detail, the first extension link 400 may be composed of a fixed part 410 that extends laterally from the first connecting part 500, and a movable part 420 that is slidably coupled to the fixed part 410 and is bent forwards.

As the movable part 420 slides laterally with respect to the fixed part 410, its lateral length may be varied to be adjusted depending on the width of the wearer's shoulder. Alternatively, the movable part 420 is slidable such that its length is variable forwards or backwards with respect to the fixed part 410.

The apparatus may further include a first upper-arm rotating part 700 that extends in parallel with the upper arm outside the upper arm, is rotatably coupled at one end thereof to the first upper-arm fixing part 600 with respect to a fifth rotating axis extending in a direction parallel to the ground, and is movable at the other end in the up and down direction.

The first upper-arm fixing part 600 may be coupled at one end thereof to the other end of the first extension link 400 to be rotatable about the fourth rotating axis extending in the up and down direction. That is, the first upper-arm fixing part 600 is rotated laterally at the other end of the first extension link 400, so that the other end may be moved forwards or backwards.

The first upper-arm rotating part 700 may be coupled to the other end of the first upper-arm fixing part 600 to be rotatable in the up and down direction. A fifth rotating axis may extend in the plane parallel with the ground, and may be perpendicular to the fourth rotating axis that is perpendicular to the ground. The extending direction of the fifth rotating axis may be varied by the rotation about the fourth rotating axis of the first upper-arm fixing part 600, may extend laterally or forwards or backwards, or may extend obliquely between the lateral direction and forwards or backwards.

The first upper-arm rotating part 700 may be coupled to the first upper-arm fixing part 600 to be rotatable about the fifth rotating axis. As the first upper-arm rotating part 700 rotates about the first upper-arm fixing part 600, a rotating force may be generated by a separate configuration inside the first upper-arm rotating part 700. The separate configuration generates the elastic force using the elastic member, thus generating the rotating force to rotate the first upper-arm rotating part 700.

In particular, the rotating force may be generated to rotate the first upper-arm rotating part 700 in a direction where the other end of the first upper-arm rotating part 700 moves upwards.

The first upper-arm rotating part 700 may have an extension part 710 that extends to a lower portion of the upper arm to support the upper arm.

The extension part 710 may be formed on the other end of the first upper-arm rotating part 700 to surround the wearer's upper arm. In particular, the extension part 710 may extend to the lower portion of the upper arm to surround the lower portion of the wearer's upper arm, thus applying a support force for rotating the upper arm upwards to the upper arm.

It should be understood that in some embodiments, the apparatus may further include a second upper-arm rotating part that extends in parallel with the wearer's other upper arm outside the upper arm.

Although the present disclosure is described with reference to specific embodiments shown in the drawings, it is apparent to those skilled in the art that the present disclosure may be changed and modified in various ways without departing from the scope of the present disclosure, which is described in the following claims.

What is claimed is:

1. A wearable apparatus for assisting muscular strength, the wearable apparatus comprising:
    a base for securing to a wearer's torso;
    a first rotary link comprising a first end and a second end, the first rotary link extending from the first end to the second end, the first end of the first rotary link coupled to the base to be rotatable about a first rotating axis that extends in a up and down direction, and the second end of the first rotary link is configured to be located on a first side of the wearer, the second end being moved forwards or backwards as the first rotary link rotates about the base;

a first extension link comprising a first end and a second end, first end of the first extension link is configured to be located on the wearer's back and the second end of the first extension link is configured to be located on a wearer's torso, the first extension link being bent forward at a location between the first end and the second end;

a first connecting part comprising a first end and a second end, the first end of the first connecting part is configured to be coupled to the second end of the first rotary link to be rotatable about a second rotating axis that extends forwards or backwards, the second end of the first connecting part is configured to be coupled to the first end of the first extension link to be rotatable about a third rotating axis that extends forwards or backwards, and the first connecting part being connected to the first rotary link to perform a relative motion vertically or laterally in a state where the first extension link is parallel with the first rotary link; and a first upper-arm fixing part comprising a first end and a second end, the first end of the first upper-arm fixing part configured to be coupled to the second end of the first extension link, the second end of the first upper-arm fixing part being rotatable about a fourth rotating axis that extends in the up and down direction, and the second end of the first upper-arm fixing part is configured to be connected to one upper arm of the wearer.

2. The wearable apparatus of claim 1, further comprising:
a fixing link configured to be fixed to the wearer while being located on the wearer's back, and extending in a up and down direction of the wearer,
wherein the base is fixedly coupled to the fixing link.

3. The wearable apparatus of claim 2, further comprising:
a second rotary link comprising a first end and a second end, the second rotary link extending from the first end to the second end, the first end of the second rotary link is configured to be coupled to the base to be rotatable about a rotating axis extending in the up and down direction, and the second end of the second rotary link is configured to be located on a second side of the wearer and is moved forwards or backwards as the second rotary link rotates about the base,
wherein the second rotary link is configured to extend to to the first side of the wearer, so that the first end thereof is rotatably coupled to the base on the first side of the wearer with respect to a center of the base.

4. The wearable apparatus of claim 3, wherein the first end of the first rotary link is configured to be located on the second side of the wearer with respect to the fixing link, and the first end of the second rotary link is is configured to be located on the first side of the wearer with respect to the fixing link, and
the first rotary link and the second rotary link are rotatably coupled to the base, respectively, to be spaced apart from each other in the up and down direction.

5. The wearable apparatus of claim 1, wherein the first end of the first rotary link is configured to extend to a second side of the wearer to be rotatably coupled to the base on the second side of the wearer with respect to a center of the base.

6. The wearable apparatus of claim 1, further comprising:
a first rotary elastic member located between the first end of the first rotary link and the base, and applying a rotating force to the first end of the first rotary link to rotate the first rotary link in a direction in which the second end of the first rotary link comes into close contact with the wearer's back.

7. The wearable apparatus of claim 1, wherein the first connecting part comprises a first bending link and a second bending link, wherein a first end of the first bending link is coupled to the first rotary link and a second end of the first bending link is coupled to the first extension link, and a first end of the second bending link is coupled to the first rotary link and a second end of the second bending link is coupled to the first extension link to be spaced apart from both the first end and the second end of the first bending link.

8. The wearable apparatus of claim 1, further comprising:
a first elastic tension member comprising a first end and a second end, the first end of the first elastic tension member is coupled to first extension link, and the first elastic tension member applies an elastic force so that the first extension link moves upwards or outwards with respect to the first rotary link.

9. The wearable apparatus of claim 1, wherein the first connecting part comprises a first bending link and a second bending link, wherein a first end of the first bending link is coupled to the first rotary link and a second end of the first bending link is coupled to the first extension link, and a first end of the second bending link is coupled to the first rotary link and a second end of the second bending link is coupled to the first extension link to be spaced apart from both the first end and the second end of the first bending link, and
the first bending link and the second bending link extend to be spaced apart from a first elastic tension member, the first elastic tension member comprising a first end and a second end, the first end of the first elastic tension member is coupled to the first rotary link at a position where the first bending link is coupled to the first rotary link and the second end of the first elastic tension member is coupled to the first extension link at a position where the second bending link is coupled to the first extension link.

10. The wearable apparatus of claim 9, further comprising:
a first elastic tension member, a first end of the first elastic tension member is coupled to the first rotary link and a second end of the first elastic tension member is coupled to the first extension link, and the first elastic tension member applies an elastic force so that the first extension link moves upwards or outwards with respect to the first rotary link,
wherein the first elastic tension member is located between the first bending link and the second bending link,
the first bending link is bent outwards of the first elastic tension member at a position where the first bending link is coupled to the first rotary link while extending in a direction where the first elastic tension member extends, and
the second bending link is bent outwards of the first elastic tension member at a position where the second bending is coupled to the first extension link while extending in a direction where the first elastic tension member extends.

11. The wearable apparatus of claim 1, wherein the first extension link is slidable such that a length of the first extension link is is variable laterally or forwards or backwards.

12. The wearable apparatus of claim 1, further comprising:

a first upper-arm rotating part extending in parallel with the upper arm outside the upper arm, rotatably coupled at a first end thereof to the first upper-arm fixing part with respect to a fifth rotating axis extending in a direction parallel to the ground, and movable at a second end thereof upwards or downwards.

13. The wearable apparatus of claim 12, wherein the first upper-arm rotating part comprises an extension part configured to extend a lower portion of the upper arm to support the upper arm.

* * * * *